United States Patent [19]

Hunter

[11] Patent Number: 5,516,997
[45] Date of Patent: May 14, 1996

[54] BATTERY POWERED DENT PULLING DEVICE

[76] Inventor: Robert E. Hunter, N. 11906 Ritchey Rd., Spokane, Wash. 99204

[21] Appl. No.: 351,935

[22] Filed: Dec. 8, 1994

[51] Int. Cl.⁶ ................................................. B23K 9/20
[52] U.S. Cl. ................................................. 219/98; 72/705
[58] Field of Search ........................... 219/98, 99, 130.1; 72/705; 439/38

[56] References Cited

U.S. PATENT DOCUMENTS

| | | | |
|---|---|---|---|
| 2,900,853 | 8/1959 | Steck | 72/705 |
| 3,612,739 | 10/1971 | Korneff | 373/78 |
| 3,801,772 | 4/1974 | Curcio et al. | 219/98 |
| 3,854,029 | 12/1974 | Fenollar | 72/705 |
| 3,880,648 | 4/1975 | Forrest | 75/10.38 |
| 3,959,619 | 5/1976 | Schill | 219/50 |
| 4,376,385 | 3/1983 | Davis | 72/479 |
| 4,484,055 | 11/1984 | Hainer et al. | 219/86.21 |
| 4,531,971 | 7/1985 | Sugiura et al. | 75/10.38 |
| 4,590,357 | 5/1986 | Winkler | 219/130.1 |
| 4,676,562 | 6/1987 | Adshead et al. | 439/38 |
| 4,706,258 | 11/1987 | Sugiura et al. | 373/2 |
| 4,924,056 | 5/1990 | Bevilacqua | 219/98 |
| 5,264,020 | 11/1993 | Ehle et al. | 373/80 |
| 5,333,486 | 8/1994 | Ishihara | 72/705 |
| 5,440,091 | 8/1995 | Galbraith et al. | |

*Primary Examiner*—Clifford C. Shaw
*Attorney, Agent, or Firm*—David S. Thompson

[57] ABSTRACT

A battery powered dent puller for re-contouring sheet metal having a dent is disclosed. A direct current welding electrode mounted on a handle allows the user to attach the electrode to an indentation in sheet metal with a very brief surge of 12 volt direct current. The welding current is regulated by means of a switch mounted on the handle which controls a relay through which the current travels. Once the electrode is attached on the sheet metal, the user may pull with considerable force in a direction that is generally in-line with the electrode. The force of the user pulling on the sheet metal tends to alter the contour of the metal, thus pulling out the indentation. To disengage the electrode from the sheet metal, the user twists the electrode, which breaks the weld. The battery power supply allows portability, increases safety, and tends to reduce assembly costs.

5 Claims, 5 Drawing Sheets

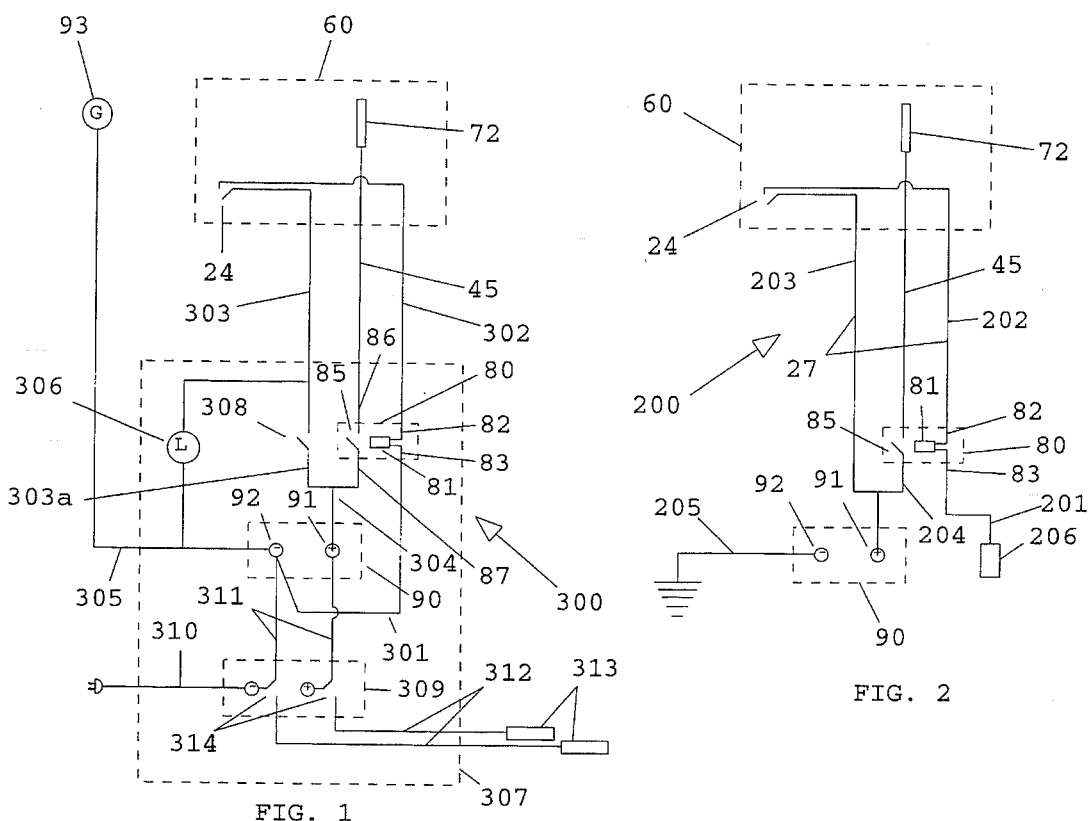
FIG. 1
FIG. 2
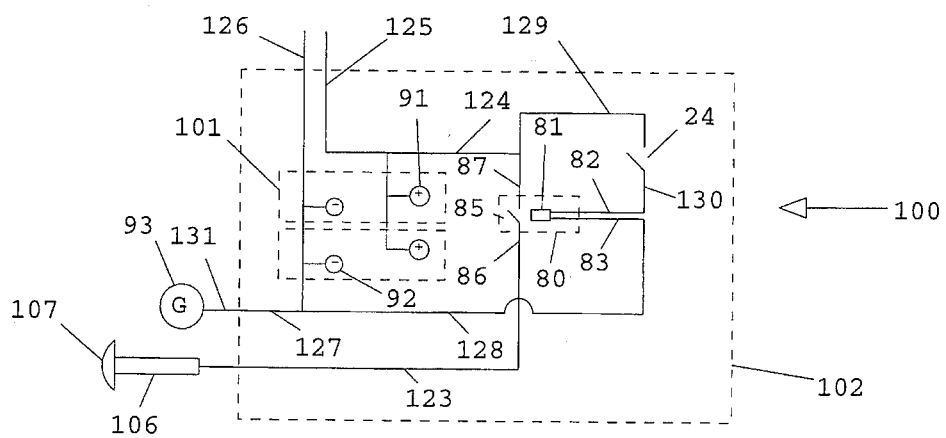
FIG. 3

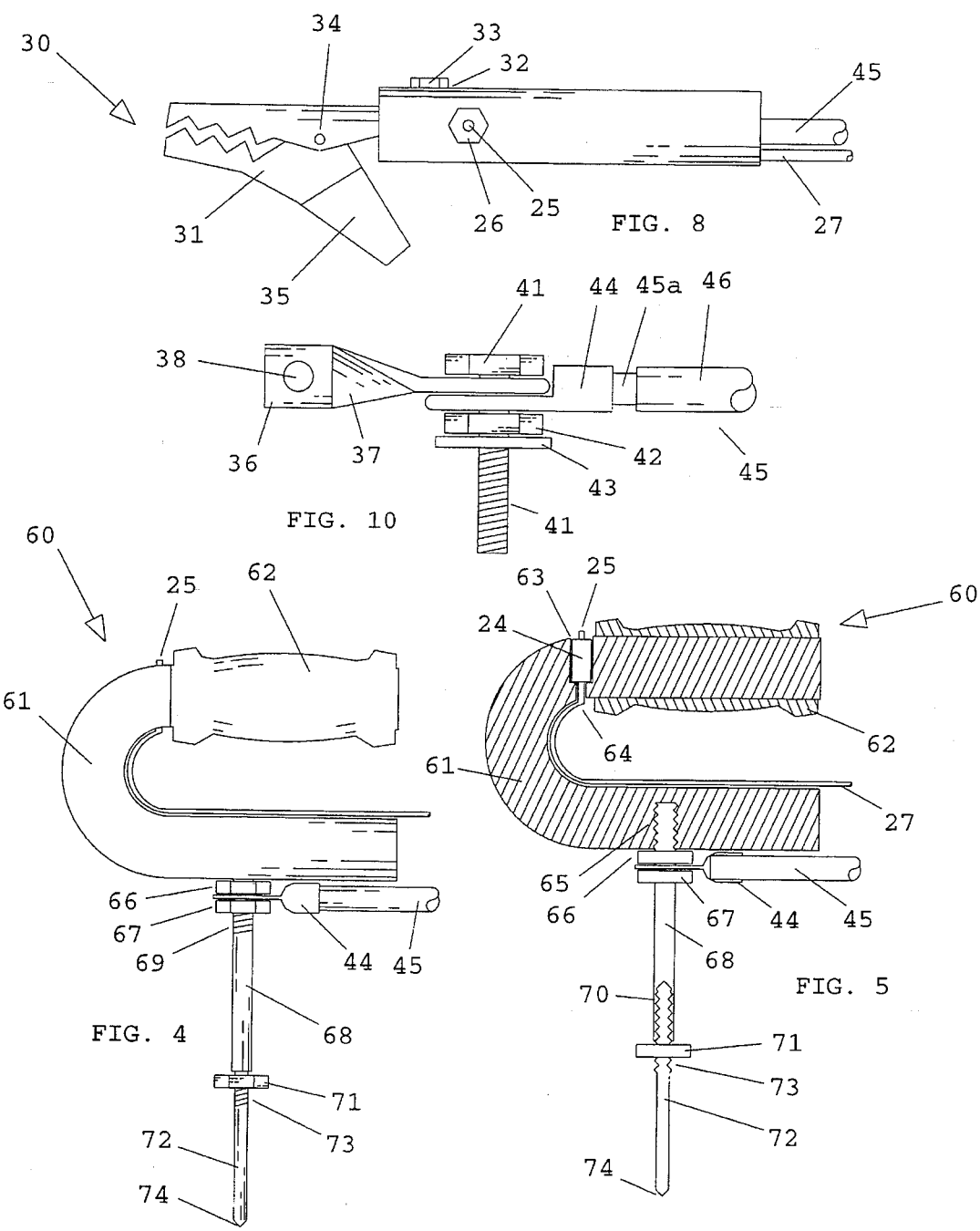

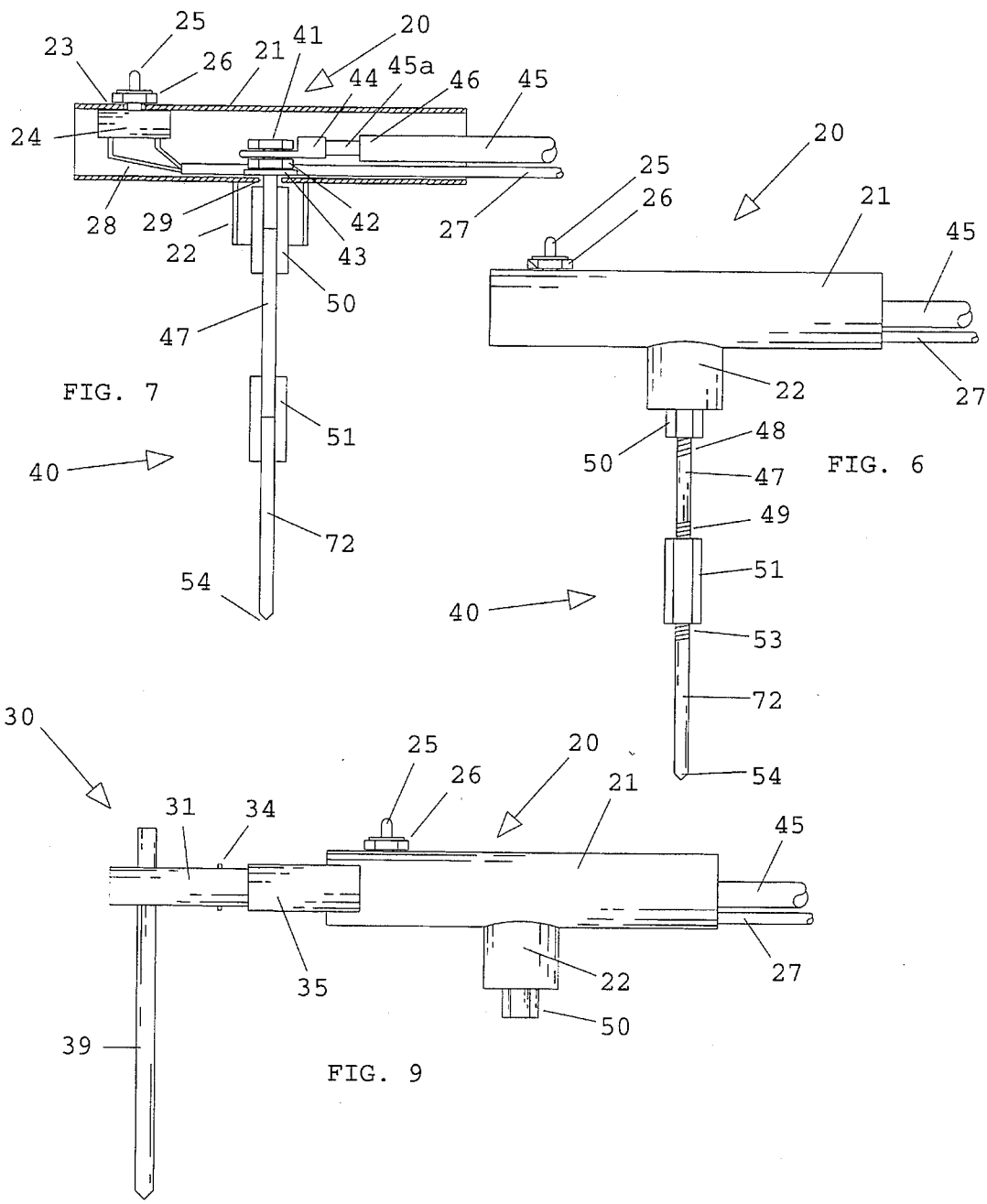

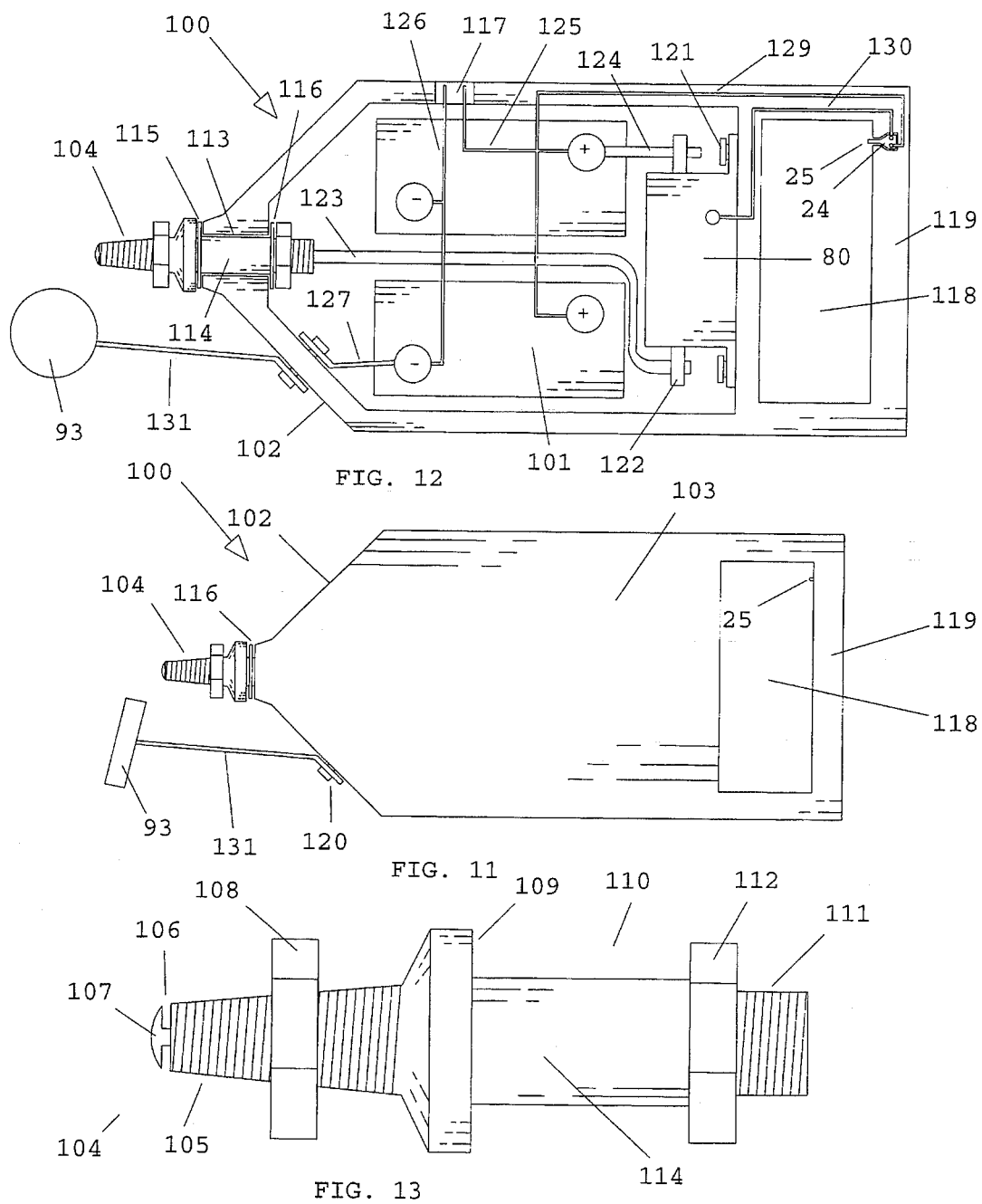

BATTERY POWERED DENT PULLING DEVICE

CROSS-REFERENCES

There are no applications related to this application filed in this or any foreign country.

BACKGROUND

The ability to repair dented sheet metal, typically car body panels, is of economic importance because when repair is possible it is generally more economical than replacement. The problem that must generally be overcome is that the back portion of the panel is inaccessible, and since most dents are inwardly directed, the dent typically must be pulled to be repaired.

Pulling dents may be accomplished in several ways. Early methods involved drilling a small hole and inserting a pulling tool. More recently, welding a metallic stud to the dent and pulling the stud to reduce the dent has become almost a standard method of smoothing a dent. Such studs resemble a small nail having a head portion that is welded to the sheet metal. The nail is first welded in place. Next, a slide hammer or some type of clamp-on pulling tool is used to pull on the nail and re-contour the sheet metal. At the this point, the nail body is typically cut off, leaving the head still welded to the sheet metal. A time-consuming grinding process then removes the nail head. This method of dent pulling has several disadvantages. The primary disadvantage is the time, effort, and different tools that are required for each step. Also, the user is generally limited in the amount of force that can be put on the stud when pulling it outwardly. The limit is generally less than what is desired, and the studs will often break loose, requiring the process to be repeated. Also, the small area of sheet metal actually welded to the stud, combined with the metal weakening stresses associated with welding process, may result in a hole being formed in the sheet metal. Another hazard is a build-up of residue formed in the welding process. Such residue causes a more uneven final surface, and extra work is required to attempt to remove it.

In part to address these concerns, a new generation of dent pullers has been developed. These new dent pullers are not yet so widely used, but have many advantages over the industry standard stud-welded-to-sheet-metal method of dent pulling. The new generation of dent pullers uses a stick, pull, twist technology in which an electrode, larger than a welding stud, is welded to the indentation in the sheet metal panel. In this method, the user first sticks or welds the electrode to the dent. Once the welded connection is made, the handle of the welding unit is pulled in the direction of the electrode, to reduce the indentation. The electrode's attachment to the sheet metal is released by twisting. This process may be repeated very quickly, and therefore is highly productive.

This type of dent puller is more productive and rugged than the earlier described system, but nevertheless still has several flaws. The principle flaw is the danger of higher-voltage alternating current, particularly when compared to the safety of low-voltage direct current. Also, such stick-pull-twist dent pullers are limited by their need for an alternating current outlet. Such outlets are often inconveniently located, and may be totally lacking in some industrial areas that are wired only for higher voltages. Moreover, alternating current welding often tends to leave more residue that direct current welding. Perhaps most importantly, alternating current welding dent pullers tend to be quite expensive.

For the foregoing reasons, there is a need for new dent puller of the stick-pull-twist type that uses direct current, rather than alternating current, and uses battery power, rather than power from an outlet.

SUMMARY

The present invention is directed to an apparatus that satisfies the above needs. A novel dent puller that employs the stick, pull, twist technology is provided. The stick, pull, twist method of dent pulling allows the user to attach the electrode to the body panel by means of a spot weld. Then by pulling on the electrode the user is able to straighten the sheet metal. To release the electrode the user twists the electrode.

Each version of the invention provides for direct current welding to allow the use of heavy duty batteries as the power source. Battery power and direct current welding makes the the dent pullers portable and allows them to be used in areas where electrical outlets are unavailable or are an incorrect voltage level. Most importantly, low-voltage direct current is much safer for the workers to use than higher-voltage alternating current.

A preferred version of the dent puller of the present invention provides:

(a) an electrode which may be removably attached to a dent in sheet metal;

(b) a direct current battery to supply power to weld the electrode to the dented sheet metal;

(c) a handle to support the electrode and to allow the user to pull on the electrode to re-contour the sheet metal after the electrode has been attached to the dent; and (d) a control switch, typically mounted on the handle, that controls the state of a relay that controls the flow of current to the electrode.

It is therefore a primary advantage of the present invention to provide a novel dent puller that uses the stick, pull, twist method of dent pulling.

Another advantage of the present invention is to provide a dent puller that uses direct current from a battery to attach the electrode to the dented sheet metal.

Another advantage of the present invention is to provide a dent puller that makes a weld using safe, low-voltage, direct current.

Another advantage of the present invention is to provide a dent puller that makes a weld that is cleaner in that it leaves behind less residue, is less likely to burn, and separates cleanly when the electrode is removed.

A still further advantage of the present invention is to provide a dent puller that uses battery power to weld the nails or studs that are typically used to pull dents to the dented sheet metal.

DRAWINGS

These and other features, aspects, and advantages of the present invention will become better understood with regard to the following description, appended claims, and accompanying drawings where:

FIG. 1 shows an electrical schematic of a heavy duty version of the dent puller of the invention;

FIG. 2 shows an electrical schematic of a light duty version of the dent puller of the invention;

FIG. 3 shows an electrical schematic of a hand held version of the dent puller of the invention;

FIG. 4 shows a side orthographic view of a U-shaped handle with an electrode, suitable for use with either the heavy duty or light duty versions of the invention;

FIG. 5 shows a cross-sectional view of the handle of FIG. 4;

FIG. 6 shows a side orthographic view of a T-shaped handle with an electrode, suitable for use with either the heavy duty or light duty versions of the invention;

FIG. 7 shows a cross-sectional view of the handle of FIG. 6;

FIG. 8 shows a top orthographic view of the handle of FIG. 6 having an optional alligator clamp;

FIG. 9 shows a side orthographic view of the handle of FIG. 8 having the optional alligator clamp;

FIG. 10 shows a somewhat enlarged side orthographic view of the inside components of the handle seen in cross-section in FIG. 7;

FIG. 11 shows a top orthographic view of the hand held version of the invention;

FIG. 12 shows a somewhat enlarged top orthographic view of the dent puller of FIG. 11, having the top of the enclosure removed to reveal the inside components;

FIG. 13 shows an enlarged view of the nose portion of the handheld version of the dent puller of FIG. 12, removed from the enclosure;

DESCRIPTION

The present invention is directed to an improved dent puller, having the advantages of battery powered operation and portability. Three versions of the invention are disclosed: a heavy duty model, a light duty model, and a hand held model. Additionally, both T-shaped and U-shaped handles that are usable on either of the first two versions of the invention are also disclosed.

The improved dent puller generally provides an electrode suitable for direct current welding, a source of battery power, a relay to control the flow of direct current power to the electrode, and a switch to control the relay.

Figure 14:
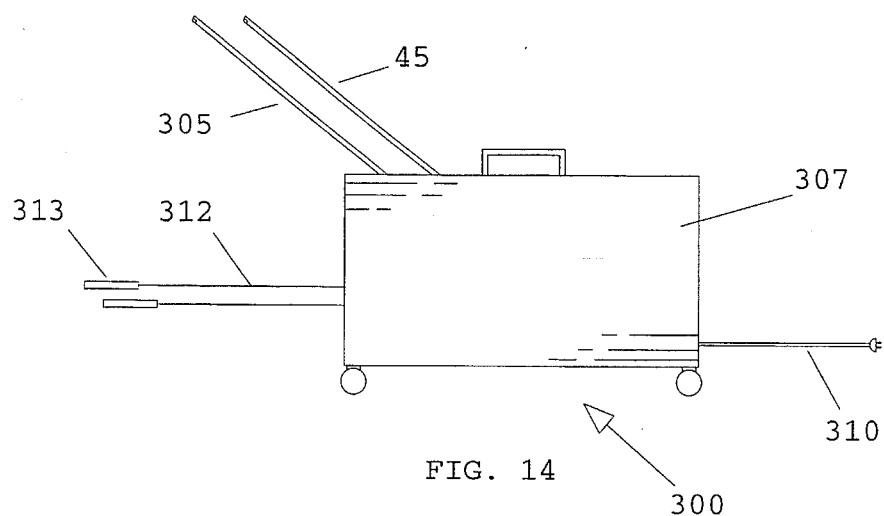
FIG. 14 shows a side view of the roll-around enclosure housing the components seen in the circuit diagram of FIG. 1.

FIG. 1 of the drawings shows an electrical diagram associated with the heavy duty model 300. The schematic is generally divided into electronics contained in each of three areas: the handle 60, the roll-around enclosure 307, and several items not in the enclosure or associated with the handle. The handle, as will be described subsequently, may be of several different types, the two best-known being the U-shaped handle 60 seen in FIGS. 4, 5, and 15, and the T-shaped handle 20 seen in FIGS. 6 through 10. The roll-around enclosure 307 enclosure is seen in FIG. 14, and generally provides four small wheels and a top-mounted carrying grip.

A heavy duty battery 90 is of a commercially available type that is sealed and leakproof. The battery is suitable for shipping, and may even be turned up-side-down without damage. In many respects, however, the battery is similar to an automotive battery, and is generally sold for that purpose. The battery provides a positive terminal 91 and a negative terminal 92. A relay device 80 is similar to those used in trucks and other vehicles. The relay provides a coil 81 that is connected to a current input 82 and a current output 83. The coil, when activated, closes the normally open switch 85. When closed, the switch 85 electrically connects a first terminal 86 to the second terminal 87. The purpose of the relay is generally to allow control over a large current, passing between the terminals 86, 87 through switch 85 by controlling the much smaller current through coil 81. This safety feature allows the user to control the large current through switch 85 by operating switch 24. An on-off switch 308 is of a type, such as a slider or toggle switch, that will stay in either state until moved by the user. A "power-on" indicator light 306, indicates the position of the on-off switch. A battery charger 309 is of a type that is commercially available to recharge automotive, 12 volt direct current, batteries. The charger has an alternating current plug 310 to allow it to be plugged into 120 volts of alternating current, and power leads 311 that connect to the battery 90, for charging.

An insulated heavy copper cable conductor 304, such as #2 welding cable, is used to connect the positive terminal 91 of the battery 90 to the relay switch terminal post 87. A similar welding lead 45 is used to connect the other relay switch terminal 86 to the electrode 72. These conductors must be heavy weight, due to the current that passes through them.

A much lighter weight electrical conductor 303 may be used to connect the switch 24 in the handle 20 or 60 to one lead of the on-off switch. Light weight conductor 303a connects the lead on the other side of the on-off switch to the positive battery terminal, as seen in FIG. 1.

Similarly, the other side of switch 24 is connected to the current input 82 of the coil 81 of the relay 80 by a light weight conductor 302. Light weight conductor 301 connects the current output 83 of the relay 80 to the negative battery terminal. Indicator light 306 is wired to positive terminal of the battery through the on-off switch 308, and to the negative terminal of the battery, as seen in FIG. 1.

The electronic components in the handle include a switch 24 and the electrode 72. The switch 24 is typically of a push-button type, but could alternatively be of a slider or similar type. It should be chosen for its ability to allow the user to make electrical contact, i.e. close the switch, for very short periods of time. The time that the switch 24 is closed results in time that power is applied to the electrode 72, and is usually about half a second. The electrode 72 is of a type that is suited for direct current dent pulling.

A magnetically supported ground device 93 is connected to the negative terminal 92 by a heavy cable 305, typically #2 copper welding cable. The magnetic ground 93 has magnets (not shown) that hold it onto the sheet metal being repaired, typically very close to the dent being welded. The magnetic ground device must be attached to an area that is bare of paint, in order to make good electrical contact.

FIG. 14 shows the housing 307 of the heavy duty version 300 of the invention. The housing is supported by four wheels and provides a handle on the top. Alternating current plug 310 is shown extended from one side of the enclosure. The electrically conducting cable 305 that attaches to the magnetically supported grounding device 93 is shown. The welding lead 45 that attaches to the handle 20, 60 is also shown. Not shown for reasons of clarity, are the handle 20, 60, the ground device 93, and the cables 302, 303 that attach to the switch in the handle.

The alternating current powered battery charger is capable of charging car batteries other than the battery 90 carried by the roll-around enclosure. Conductors 312 and alligator clips 313, as seen in FIG. 1, allow the user to charge any car battery. The conductors 312 should be long enough to reach a battery without removing it from the car. The unit 307 is simply rolled to a convenient location, plugged into an ac outlet, and the alligator clips 313 attached to the car battery terminals. Switch 314 allows the terminals of the battery charger 309 to be connected to either the battery 90 or to the charging clips 313, but not both simultaneously.

FIG. 4 of the drawings shows a side view of the U-shaped version 60 of the handle used with either the heavy duty or light duty versions of the invention. Handle 60 serves as a support for the electrode 72. A U-shaped piece of solid aluminum rod 61 forms a very strong body portion having two ends. A rubber or foam rubber cover 62 is provided to increase both the comfort and grip of the user. As seen in FIG. 5, a bored hole 63 is provided adjacent to the rubber cover and is sized appropriately to receive a switch 24 having a push button actuator 25. Switch leads 64 are soldered to a control cable 27 which comprises both conductors 302 and 303, as seen in the schematic drawing of FIG. 1. The push button actuator 25 should be positioned for comfortable use, and is typically toggled by means of pressure by the thumb.

A bored and tapped hole 65 is provided on the end of the handle opposite the rubber grip. The hole 65 is threaded in such a manner to allow the threaded electrode holder 68 to be engaged in a secure manner. The electrode holder 68 is a generally cylindrical structure which provides one end having a threaded area 69 and a second end that has a bored and tapped hole 70 that is threaded appropriately to carry the electrode 72. The electrode holder 68 carries an upper nut 66 and a lower nut 67 on either side of terminal crimp connector 44, which has a hole sized to fit over the holder 68. The upper and lower nuts 66, 67 hold the crimp connector 44 tightly in place against the body 61 of the U-shaped handle.

The electrode 72 has one threaded end 73 that may be screwed into the threaded hole 70 of the electrode holder 68. A jam nut 71 is internally threaded to fit the outside threads 73 of the electrode 68. The electrode tip 74 is somewhat sharpened, in a manner that is typical of commercially available electrodes used by alternating current dent pullers.

Figure 15:
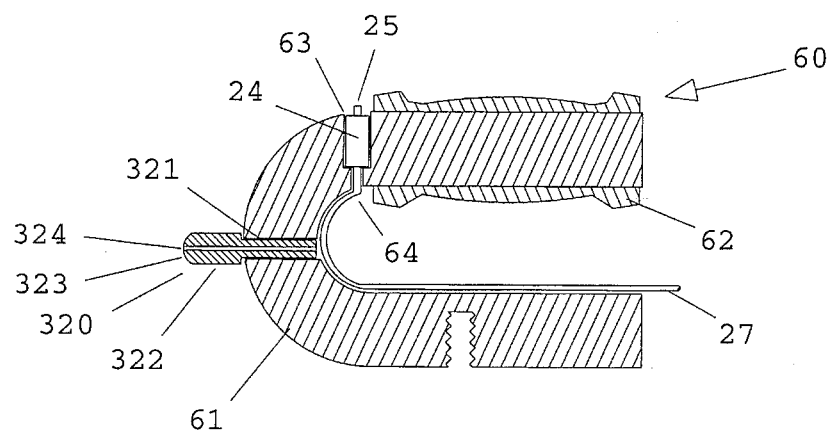
FIG. 15 shows the U-shaped handle of FIG. 5 having a shrink tool installed.

FIG. 15 shows a cross-sectional view of the U-shaped handle with the addition of a combined shrink tool and nail head welder 320. This tool is made of copper and is press-fit into a hole bored in the aluminum U-shaped handle. Shrink tools are well-known, and are used to reduce outwardly directed dents. Shrink tools operate by first heating the area around the dent. As the metal cools, it tends to contract and assume a more desirable contour. The shrink tool provides a shank 321 that is press-fit into a hole bored into the U-shaped handle, a body 322 that extends outwardly from the handle, and a head 323 that has a rounded shaped that is useful when working on outwardly directed dents. The shrink tool and nail head welder also provides an axial hole 324 that is approximately the length of the nail or stud type electrode 106 seen in FIG. 16. To use the tool 320 as a shrink tool, no stud 106 is used. The user simply touches the head 323 to the area of the dent and current flow heats the metal. To use the tool 320 as a nail head welder, the user inserts a nail 106 into the oversized hole 324. When the nail head 107 is touched to the sheet metal a welded connection will be made.

FIG. 6 shows a side view of the T-shaped version 20 of the handle used with either the heavy duty or light duty versions of the invention. The handle 20 provides a tube body 21 having a short, centrally located perpendicular tube, serving as a heat guard 22, as seen in FIGS. 6 through 9. Handle 20 serves as a support for the electrode 72.

FIG. 7 shows a side-view cross-section of the T-shaped version of the handle. The switch 24 is seen at one end of the tube 21. The switch 24 extends through hole a 23 in the tube 21, and is held in place by nut 26. A push button actuator 25 is typically pushed by the user's thumb, and provides a momentary electrical contact in switch 24. Leads 28 extend from the switch 24, and attach to cable 27 whose conductive elements correspond to wires 302 and 303 in the schematic of FIG. 1.

A hole 29, is located in the tube 21 in the center of heat guard tube 22. Terminal bolt 41 passes through the hole 29 and protrudes from tube 21 in a perpendicular direction. Crimp connector 44 is carried by the bolt 41, and electrically connects the bolt 41 to the conductor 45a of welding lead 45. Insulation 46 covers the welding lead, which typically carries 12 volts of direct current. A nut 42 holds the crimp connector 44 tightly against the head of the terminal bolt 41. A washer 43 is carried by the terminal bolt 41, and rests over the hole 29 in the tube 21.

Referring to both FIGS. 6 and 7, the electrode assembly 40 of the T-shaped tube handle 20 is seen. An upper hex coupling 50 having an internal thread and a six sided exterior is threadedly engaged to the portion of the terminal bolt 41 that extends outside tube 21. A washer may be used between coupling 50 and tube 21. The length of the coupling 50 is such that it also threadedly engages the upper threaded portion 48 of the electrode extension 47. A similar lower hex coupling 51 is also internally threaded, and engages the lower threads 49 of the extension 47. The upper threaded portion 53 of the electrode 72 is also threaded into the lower portion of the coupling 51. The tip 54 is slightly pointed in most commercially available dent pulling electrodes, but may also be generally flat, to attach more surface area to the dent.

FIG. 8 shows a top-view of the T-shaped handle of FIG. 6, with the addition a welding assembly 30. An alligator holder 31 may be used to hold a welding electrode (seen in FIG. 9). The alligator holder 31 is attached to tube 21 by means of nut and bolt pair 33 that extend through hole 32 in tube 21. The alligator holder 31 is of ordinary construction, having a lever handle 35 that causes the jaw to rotate about pivot 34. A spring biases the jaw closed.

FIG. 9 shows a side view of the T-shaped version 20 of the handle showing the welding assembly 30, including the electrode 39 held by the alligator holder 31. The electrode and electrode extension are removed in this view. Note that electrode 39 does not have to be threaded in a manner similar to electrode 54.

FIG. 10 shows a side-view of the electrical connections inside the T-shaped version of the handle. This view is similar to FIG. 7, but includes the addition of bus bar 36 which is held between the head of terminal bolt 41 and the crimp connector 44. The bus bar is generally made from solid aluminum, to reduce costs, but may also be made of copper. A 90 degree twist 37 in the bar 36 is required, since the nut and bolt 33 mounting the alligator clip 31 to the bus bar 36 is at right angles to the terminal bolt 41. A hole 38 in the bus bar 36 allows nut and bolt 33 passing through hole 32 to hold the bar 36 in electrical contact with the alligator 31.

FIG. 2 shows an electrical diagram associated with the light duty version of the dent puller of the invention. The battery 90 in this version of the invention is typically the car battery of the car being repaired. The negative terminal 92 is attached by means of conductor 205 to the car body or frame, in the typical negative ground configuration. Since this configuration is typical, conductor 205 is usually present in the car, and does not have to be supplied. A relay 80 is similar to that already described in FIG. 1. The handle 60 is also as already described, having a control switch 24 and an electrode 72. Conductor 203 connects the control switch 24 to the positive terminal 91 of the battery 90. Conductor 202 connects the control switch 24 to the coil 81 of the relay 80. Conductor 201 connects the coil of the relay to negative ground, typically by means of an alligator clip 206. Conductor 204 is a heavy, typically multi-stranded wire that connects the positive terminal of the battery to the switch 85 of the relay 80, and serves as direct current supply means.

An insulated heavy copper cable conductor 204, such as #2 welding cable, is used to connect the positive terminal 91 of the battery 90 to the relay switch 85. A similar heavy welding lead 45 is used to connect the other side of the relay switch to the electrode 72. These conductors must be heavy weight, due to the current that passes through them.

FIG. 3 shows an electrical diagram associated with the hand held version 100 of the dent puller of the invention. A dashed line encloses those components that are inside the enclosure body 102, seen in FIGS. 11 through 13. Two smaller batteries 101 are used, each having a positive terminal 91 and a negative terminal 92. Wires 125, 126 connect the terminals of the batteries to a socket (not shown) in the edge of the enclosure body 102 that may be plugged into a battery charger which is used to recharge the batteries of the unit 100 when not in use. A relay 80 and control switch 24 are similar to the two previously described versions of the invention. As seen in FIG. 12, the relay 80 is held in place in enclosure 1022 by bolt 1221. Switch 24 allows the user to complete a circuit, activating the coil 81 of the relay 80 by causing current to flow into lead 822 and out of lead 83 of the relay 80. Activation of the coil causes the switch 85 to close, causing a high-amperage current to flow from the positive terminals through a heavy duty conductor 124 into switch terminal 87, through switch 85, out of switch terminal 86 and through a heavy duty conductor 1223 to the electrode nail 106 having head 107. Current returns to the negative battery terminals by being picked up by magnetically mounted negative ground device 93, and through conductors 131, 127.

FIG. 11 shows a top view of the hand held version of the dent puller. The nose piece 104 is separated electrically from the enclosure body 1022 and top 103 by insulating washer 116. A grounding device 93 is magnetically attachable to the sheet metal of the car, and is show in a side view. The grounding unit 93 is connected electrically to heavy duty conductor 131, which is also attached to the enclosure by a bolt 120. Opening 118 allows the user to wrap one hand about handle 119, and position a finger or thumb over push button 225 of switch 24.

Figure 16:
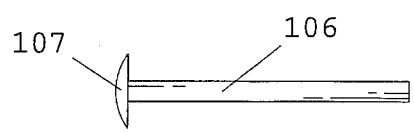
FIG. 16 shows a side view of a welding stud that may be used by the dent pullers of FIGS. 11 through 13 and 15.

FIG. 12 shows a top view of the hand held dent puller with the top removed. Two batteries 101 are mounted in the middle portion of the enclosure 102. Conductor 126 connects the negative terminals together, and to the recharge port 117. Similarly, conductor 125 connects the positive terminals together, and to the recharge port 117. Conductor 127 connects the negative terminals to the enclosure body 102 by attaching to bolt 120. Conductor 129 connects the positive terminals to the switch 24, which is operated by push button 25. Conductor 130 connects switch 24 to the coil 81 of the relay 80. In FIG. 3 conductor 128 connects the coil 81 to the negative terminals 92; in FIG. 12 current flows from coil 81 into the negatively charged case 102 via bolts 121. Heavy duty conductor 124 connects the positive terminals of the batteries to the relay switch. Similarly, heavy duty conductor 123 electrically connects the relay switch terminal post 12 with the nose piece 104. An opening 113 in the enclosure 102 allows the nose piece 104 to protrude, FIG. 13 shows in greater detail the nose piece 104 seen in both FIGS. 11 and 12. The nose piece provides a generally conically shaped collet nose 105, which is threaded to accept nut 108. The collet nose is typically fluted or notched (not shown) so that nut 108 causes collet nose 105 to grip the nail 106. The shoulder 109 is sized to rest on electrically insulating washer 115, to prevent electrical contact between the positively charged nose and the negatively charged enclosure. A tubular electrical insulator 114 encloses the body 110 of the nose. The threaded end 111 of the nose carries nut 112 and insulating washer 116. As seen in FIG. 12, nut 112 is adjusted to hold the nose piece 104 in opening 113. The body 110 and collet nose 105 contain a hollow center (not shown), so that nail 106 can be slid inside, as seen in FIG. 13. Only the head 107 of the nail is typically visible. The nail 106 is of a type widely sold for use pulling dents and is in fact an electrode. FIG. 16 shows a side view of the nail-type electrode 106, removed from the collet nose 105.

The heavy duty version 300 of the invention is typically used by first unplugging the ac power cord to the charging unit. Once unplugged, the unit may be easily moved by means of roll-around enclosure 107. Either the T-shaped handle 20 or the U-shaped handle 60 may be used. The area of the dent is sanded, to remove paint so that good electrical contact can be made, and the magnetic ground 93 is attached to the sheet metal near the dent. The user places the tip 74 of the electrode 72 on to the sheet metal and activates push button switch 24 for approximately one-half second. Closing the switch 24 activates coil 81, closing switch 85 in the relay 80. This allows current to flow from the electrode into the sheet metal and a weld is formed, joining the tip 74 and the dent. The user then pulls outwardly, re-contouring the sheet metal to more nearly resemble its original appearance. To release the tip 74 from the sheet metal, the user twists the handle 20, 60 or moves the handle at an angle, which breaks the weld. The entire process may be repeated numerous times until the sheet metal is re-contoured and the dent is substantially reduced. The ac line cord may then be plugged back into any socket, and the batteries recharged.

The light duty version of the invention is typically used by first removing the cable on the car's battery's positive terminal 91. Direct current supply conductor 204 is attached to the positive terminal 91. Alligator clip 206 is connected to the car's engine or the battery's negative terminal 92. The user then uses the handle 20 or 60 in a manner similar to that already described. Typically, handle 20 is used. This allows the user the option of attaching electrode 39, as seen in FIG. 9. Using this electrode, with electrode 72 removed, allows the user to do light welding.

The hand held version of the invention is typically used by first inserting a nail or stud 106 into the nose piece 104. The nut 108 on the collet nose 105 is tightened, holding the nail 106 firmly in place. The ground device 93 is attached magnetically to bare metal near the dent. The enclosure 102 is lifted into position, so that the nail head 107 touches the dent. The switch 24 is activated for a brief period, causing current to flow into the sheet metal, through the nail 106, welding the nail head 107 onto the dent. The user then pulls on handle 119, pulling out the dent. To break the weld, the user simply twists or turns the entire enclosure 102, which breaks the weld. The nail 106 may be replaced by loosening the nut 108. Alternatively, the nut 108 may be loosened after the nail is welded into place, thus separating the welded nail and the nose 104. In this case, the nail may be pulled in a manner similar to the currently popular system of dent pulling.

The previously described versions of the of the dent pullers of this invention have many advantages, including the portability allowed by the use of battery power. A further advantage of the above described dent pullers is the strength of the weld formed between the electrode and the dented sheet metal. An additional advantage of the above described dent pullers is the reduction in cost over prior alternating current type dent pullers. A still further advantage of the above described dent pullers is the safety of using low voltage direct current, rather than high voltage alternating current.

Although the present invention has been described in considerable detail and with reference to certain preferred versions, other versions are possible. For example, while there is considerable reference in the above disclosure to the flow of current, it should be recognized that most of the same results could be achieved if if voltage polarities were reversed and the current were to flow in the opposite direction. Similarly, other direct current voltage potentials, such as 24 volts, may also be used. Moreover, many variations on the handle supporting the electrode are possible, some of which are usable with various leverage arms and "pull bars". Therefore, the spirit and scope of the appended claims should not be limited to the description of the preferred versions contained here.

What is claimed is:

1. A dent puller for re-contouring sheet metal having a dent, comprising:

(a) an electrode, removably weldable to the dented area of the sheet metal;

(b) handle means for supporting the electrode and for allowing the user to pull the electrode after it has been attached to the dented area of the sheet metal, thereby re-contouring the dented sheet metal;

(c) direct current supply means for supplying direct current to the electrode comprising a direct current battery;

(d) switching means for controlling the flow of the direct current through the electrode;

(e) magnetically supported ground device means, supported by the sheet metal, for returning current from the sheet metal to the battery;

(f) charging means for charging the direct current battery;

(g) means, connected to the charging means, for using the charging means to charge the battery of an automobile; and (h) a housing containing the direct current battery and the switching means, the housing supposed by at least two wheels.

2. A portable, battery powered dent puller for re-contouring sheet metal having a dent, comprising:

(a) an electrode suitable for direct current dent pulling, the electrode having two ends, one end being threaded;

(b) an electrode holder, the electrode holder having a threaded first end and a bored and tapped second end, the second end being sized to attach to and support the threaded end of the electrode;

(c) a U-shaped handle providing a first and a second end, the first end having a cover and the second end providing a bored and tapped hole, the hole being suitably sized to support the threaded first end of the electrode holder;

(d) an upper and a lower nut, carried by the threaded first end of the electrode holder, the upper and lower nuts carrying a terminal crimp connector attached to a welding lead;

(e) a direct current battery having a first terminal and a second terminal;

(f) a relay device having a normally open switch and a coil to alter the state of the normally open switch, the coil having a first and a second lead, the first lead attached to the second terminal of the battery, the normally open switch having a first and a second switch terminal, the first switch terminal connected to the first terminal of the battery and the second switch terminal connected to the electrode by the welding lead;

(g) an on-off switch having a first lead and a second lead, the first lead from the switch attached to the first terminal of the battery;

(h) a control switch mounted on the handle, the control switch having first and second leads, the first lead connected to the second lead of the relay coil and the second lead connected to the on-off switch;

(i) a magnetically mountable grounding device, attached electrically to the second terminal of the battery;

(j) means for charging the direct current battery; and (k) a housing containing the direct current battery and the relay device, the housing supported by at least three wheels.

3. The portable, battery powered dent puller of claim 2, wherein the housing is supported by four wheels.

4. The portable, battery powered dent puller of claim 2, additionally comprising:

(a) means for charging the battery of an automobile.

5. The portable, battery powered dent puller of claim 2, additionally comprising:

(a) indicator light means for indicating the status of the on-off switch.

* * * * *